(12) United States Patent
Jang et al.

(10) Patent No.: US 11,479,188 B2
(45) Date of Patent: Oct. 25, 2022

(54) APPARATUS FOR LIMITING MOVEMENT OF WIRING HARNESS

(71) Applicants: Hyundai Motor Company, Seoul (KR); Kia Motors Corporation, Seoul (KR); Yura Corporation Co., Ltd., Seongnam-si (KR)

(72) Inventors: Kwon Hyeon Jang, Seoul (KR); Yun Tae Hwang, Hwaseong-si (KR); Jin Yeob Roh, Gunpo-si (KR)

(73) Assignees: Hyundai Motor Company, Seoul (KR); Kia Motors Corporation, Seoul (KR); Yura Corporation Co., Ltd., Seongnam-si (KR)

( * ) Notice: Subject to any disclaimer, the term of this patent is extended or adjusted under 35 U.S.C. 154(b) by 97 days.

(21) Appl. No.: 17/104,083

(22) Filed: Nov. 25, 2020

(65) Prior Publication Data

US 2022/0032862 A1 Feb. 3, 2022

(30) Foreign Application Priority Data

Jul. 30, 2020 (KR) ........................ 10-2020-0095514

(51) Int. Cl.
*B60R 16/02* (2006.01)
*H01B 7/00* (2006.01)
*H02G 11/00* (2006.01)

(52) U.S. Cl.
CPC ....... *B60R 16/0215* (2013.01); *H01B 7/0045* (2013.01); *H02G 11/006* (2013.01)

(58) Field of Classification Search
CPC . B60R 16/0215; H01B 7/0045; H02G 11/006
USPC ....................................................... 174/72 A
See application file for complete search history.

(56) References Cited

U.S. PATENT DOCUMENTS

| 6,492,592 | B1 * | 12/2002 | Murofushi | .......... B60R 16/0215 174/72 A |
| 2002/0151213 | A1 * | 10/2002 | Aoki | ................... B60R 16/0215 439/502 |
| 2007/0085375 | A1 * | 4/2007 | Terada | ................ B60R 16/0207 296/155 |
| 2018/0345883 | A1 * | 12/2018 | Nishi | ....................... B60N 2/06 |

FOREIGN PATENT DOCUMENTS

JP 2007261422 * 10/2007

* cited by examiner

*Primary Examiner* — Timothy J Thompson
*Assistant Examiner* — Michael F McAllister
(74) *Attorney, Agent, or Firm* — Slater Matsil, LLP

(57) ABSTRACT

An apparatus for limiting a movement of a wiring harness includes a binding unit configured to bind the wiring harness electrically connected to a moving component configured to be movable relative to a vehicle body, the binding unit configured to be movable according to a movement of the moving component, and a guide track configured to guide a movement of the binding unit, wherein the guide track defines a movement path of the binding unit.

20 Claims, 15 Drawing Sheets

APPARATUS FOR LIMITING MOVEMENT OF WIRING HARNESS

CROSS-REFERENCE TO RELATED APPLICATIONS

This application claims the benefit of Korean Application No. 10-2020-0095514, filed on Jul. 30, 2020, which application is hereby incorporated herein by reference.

TECHNICAL FIELD

The present disclosure relates to an apparatus for limiting the movement of a wiring harness.

BACKGROUND

A vehicle has moving components such as vehicle seats and vehicle doors, and the moving components are movably mounted to a vehicle body. The moving component has an electric mechanism such as an electric motor embedded therein, and a wiring harness for supplying electric energy to the electric mechanism is electrically connected to the moving component through a connector. When the moving component moves, the wiring harness moves together with the moving component. The wiring harness may have an extended length enough to allow a movement of the moving component.

However, the movement direction, tendency, and the like of the wiring harness may not be properly regulated when the wiring harness moves. Accordingly, the wiring harness may contact or interfere with nearby components, resulting in damage of the wiring harness or a short. In addition, friction between the wiring harness and the nearby components may cause excessive noise.

For example, the vehicle seat moves toward the front or rear of the vehicle on a floor of the vehicle body. An electric actuator for moving the vehicle seat is mounted in the vehicle seat, and the wiring harness for transmitting electric energy and control signals is electrically connected to the electric actuator through the connector. The wiring harness is located under the vehicle seat. As the vehicle seat moves, the wiring harness moves together with the vehicle seat. The wiring harness moving together with the vehicle seat may contact or interfere with nearby components (for example, a seat rail guiding the movement of the vehicle seat or an air-conditioning duct). As a result, the wiring harness may be damaged, or a short may occur. In addition, excessive noise may be generated due to friction between the wiring harness and the nearby components.

The above information described in this background section is provided to assist in understanding the background of the inventive concept, and may include any technical concept which is not considered as the prior art that is already known to those skilled in the art.

SUMMARY

Embodiments of the present disclosure solve problems occurring in the prior art while advantages achieved by the prior art are maintained intact.

The present disclosure relates to an apparatus for limiting a movement of a wiring harness. Particular embodiments relate to an apparatus for limiting a movement of a wiring harness capable of limiting the movement direction and path of the wiring harness connected to a moving component such as a vehicle seat or a vehicle door.

An embodiment of the present disclosure provides an apparatus for limiting a movement of a wiring harness capable of limiting the movement direction and path of the wiring harness connected to a moving component such as a vehicle seat or a vehicle door, thereby preventing damage, noise, etc. due to friction with other components.

According to an embodiment of the present disclosure, an apparatus for limiting a movement of a wiring harness may include a binding unit binding a wiring harness electrically connected to a moving component movable relative to a vehicle body, and being movable according to a movement of the moving component, and a guide track guiding a movement of the binding unit. The guide track may define a movement path of the binding unit.

The binding unit may include a binder encircling and binding an exterior surface of the wiring harness, and a slider connected to the binder. The slider may slide along the guide track.

The slider may have a guide cavity in which the guide track is received, and a cross section of the guide cavity may correspond to a cross section of the guide track.

The guide track may have a plurality of holding recesses, the plurality of holding recesses may be spaced apart from each other on the guide track, and the slider may have a holding protrusion selectively received in any one of the plurality of holding recesses.

The holding protrusion may be a hemispherical protrusion, and each holding recess may be a hemispherical recess.

The guide track may include a pair of stoppers limiting a movement of the slider.

The pair of stoppers may include a first stopper fixed to one end of the guide track, and a second stopper detachably coupled to the other end of the guide track.

The apparatus may further include a mounting plate to which the guide track is attached. The mounting plate may be mounted on a portion of the vehicle body adjacent to the moving component.

The binder may include a strap body having a plurality of teeth, and a head portion integrally connected to the strap body. The head portion may include an opening through which a free end of the strap body passes, and a latch selectively engaged with any one of the plurality of teeth.

The slider may include a top wall attached to a bottom surface of the binder, a pair of sidewalls extending vertically from the top wall, and a pair of bottom walls extending from the pair of sidewalls, respectively. The guide cavity may be defined by the top wall, the pair of sidewalls, and the pair of bottom walls.

The guide track may include a vertical portion and a horizontal portion, and both edges of the horizontal portion may protrude symmetrically from the vertical portion.

The moving component may be a vehicle seat.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF ILLUSTRATIVE EMBODIMENTS

Figure 1:
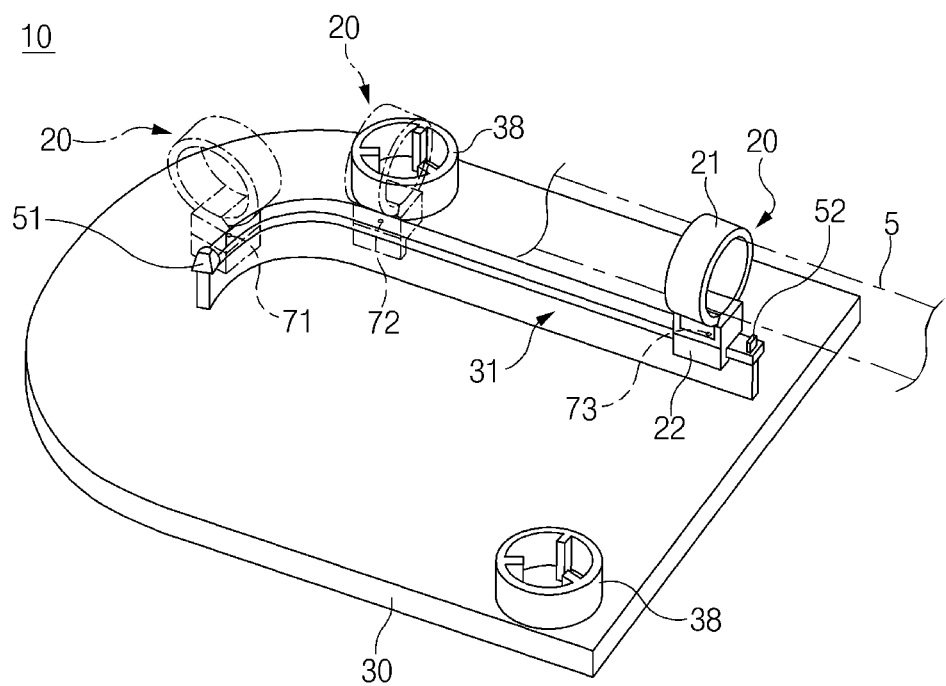
FIG. 1 illustrates a perspective view of an apparatus for limiting a movement of a wiring harness according to an exemplary embodiment of the present disclosure.

Hereinafter, exemplary embodiments of the present disclosure will be described in detail with reference to the accompanying drawings. However, the exemplary embodiments are not intended to limit the inventive concept disclosed herein to particular forms, and should be construed as covering modifications, equivalents, and/or alternatives. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

An apparatus 10 for limiting a movement of a wiring harness according to an exemplary embodiment of the present disclosure may be configured to limit the movement direction, path, and the like of a wiring harness 5 when the wiring harness 5 electrically connected to a moving component moves in response to a movement of the corresponding moving component. The moving component refers to a component such as a vehicle seat or a vehicle door which is movable relative to a vehicle body.

Referring to FIG. 1, the apparatus 10 for limiting a movement of a wiring harness according to an exemplary embodiment of the present disclosure may include a binding unit 20 binding the wiring harness 5 and a guide track 31 guiding a movement of the binding unit 20.

The wiring harness 5 may be electrically and physically connected to the moving component. As the binding unit 20 binds the wiring harness 5, the binding unit 20 may be physically connected to the moving component through the wiring harness 5.

Referring to FIGS. 5 to 8, the binding unit 20 may include a binder 21 encircling and binding an exterior surface of the wiring harness 5 and a slider 22 connected to the binder 21.

The binder 21 may include a strap body 23 extending to a predetermined length, and a head portion 25 integrally connected to the strap body 23. The binder 21 may also be referred to as a cable tie, a cable band, or the like.

The strap body 23 may extend from the head portion 25, and the strap body 23 may have a free end 23a provided on one end thereof. The strap body 23 may have a plurality of teeth 23b provided in a longitudinal direction thereof.

Figure 8:
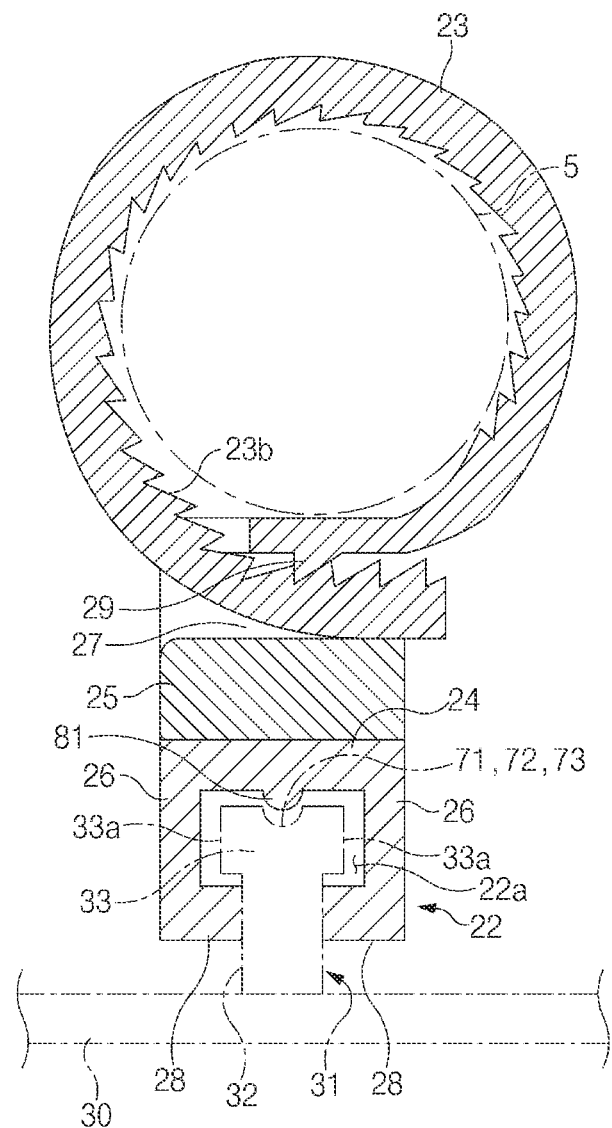
FIG. 8 illustrates a cross-sectional view, taken along line B-B of FIG. 7.

The head portion 25 may be located on the end opposite of the free end 23a of the strap body 23, and thus the head portion 25 and the free end 23a may correspond to both ends of the strap body 23. Referring to FIG. 8, the head portion 25 may have an opening 27, and a latch 29 may be provided within the opening 27 of the head portion 25. The latch 29 may be selectively engaged with any one of a plurality of teeth 23b.

Figure 6:
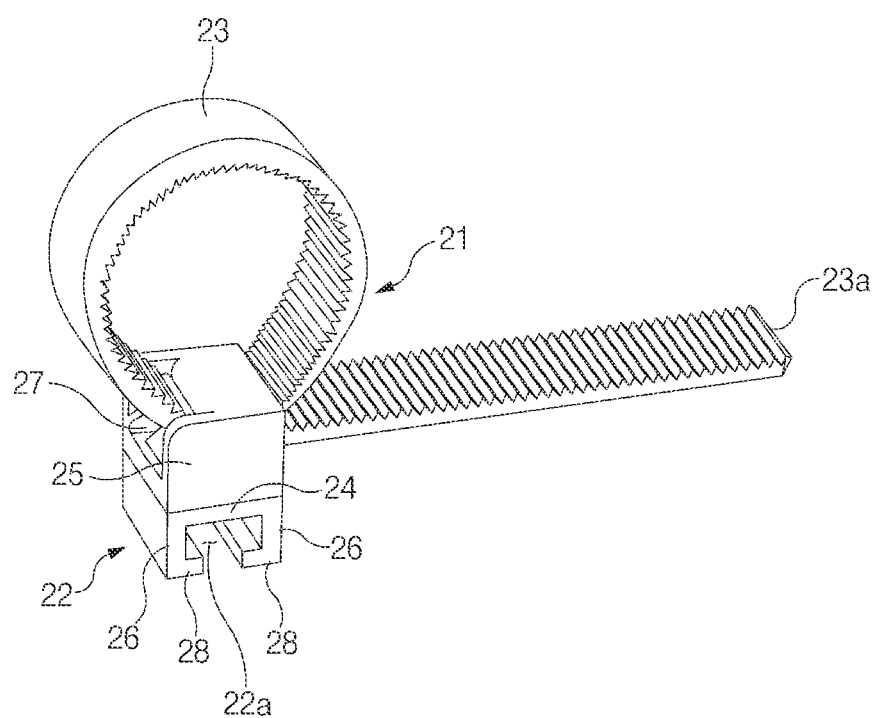
FIG. 6 illustrates a perspective view of a binding unit of an apparatus for limiting a movement of a wiring harness according to an exemplary embodiment of the present disclosure, in a state in which a free end of the strap body of the binder in the binding unit passes through a head portion of the binder.
Figure 7:
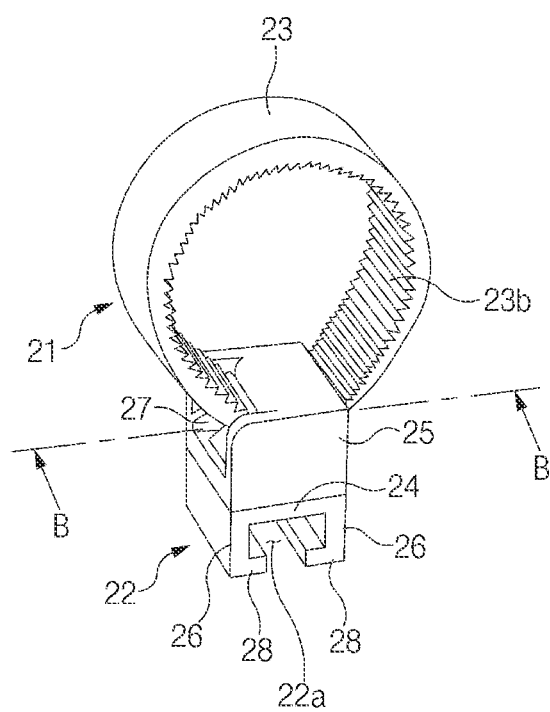
FIG. 7 illustrates a perspective view of a binding unit of an apparatus for limiting a movement of a wiring harness according to an exemplary embodiment of the present disclosure, in a state in which a strap body of a binder in the binding unit forms a loop.

Referring to FIG. 6, as the free end 23a of the strap body 23 passes through and is inserted into the opening 27 of the head portion 25, the strap body 23 may form a loop encircling the wiring harness. After the strap body 23 is tightly wound around the exterior surface of the wiring harness 5, the latch 29 may be selectively engaged with any one of the plurality of teeth 23b so that the strap body 23 may tighten the wiring harness 5. Thereafter, an unnecessary portion of the strap body 23 may be cut as illustrated in FIGS. 7 and 8. Thus, as illustrated in FIGS. 1 and 8, the binder 21 may be capable of binding the wiring harness 5 electrically connected to an electric mechanism of the moving component such as the vehicle seat or the vehicle door. An end portion of the wiring harness 5 may be physically connected to the moving component through a cable band or rubber bush having an anchor. Binding unit 20 may be physically connected to the moving component through the wiring harness 5.

The slider 22 may slide along the guide track 31. The slider 22 may have a guide cavity 22a in which the guide track 31 is received. The guide cavity 22a may extend in a longitudinal direction of the slider 22.

Referring to FIGS. 5 to 8, the slider 22 may include a top wall 24 attached to a bottom surface of the binder 21, a pair of sidewalls 26 extending vertically from the top wall 24, and a pair of bottom walls 28 extending from the pair of sidewalls 26, respectively. The top wall 24 may be horizontally flat, and the top wall 24 may have a holding protrusion 81 protruding downwardly from a bottom surface thereof. The pair of sidewalls 26 may be spaced apart from each other, and the sidewalls 26 may extend vertically from edges of the top wall 24, respectively. The bottom walls 28 may extend from bottom ends of the sidewalls 26 toward a central longitudinal axis of the slider 22, respectively, and the pair of bottom walls 28 may be spaced apart from each other. The guide cavity 22a may be defined by the top wall 24, the pair of sidewalls 26, and the pair of bottom walls 28.

The guide track 31 may be attached to a top surface of a mounting plate 30. For example, the guide track 31 and the mounting plate 30 may form a unitary one-piece structure. As another example, the guide track 31 may be joined to the top surface of the mounting plate 30 by welding, using fasteners, and/or the like.

Figure 2:
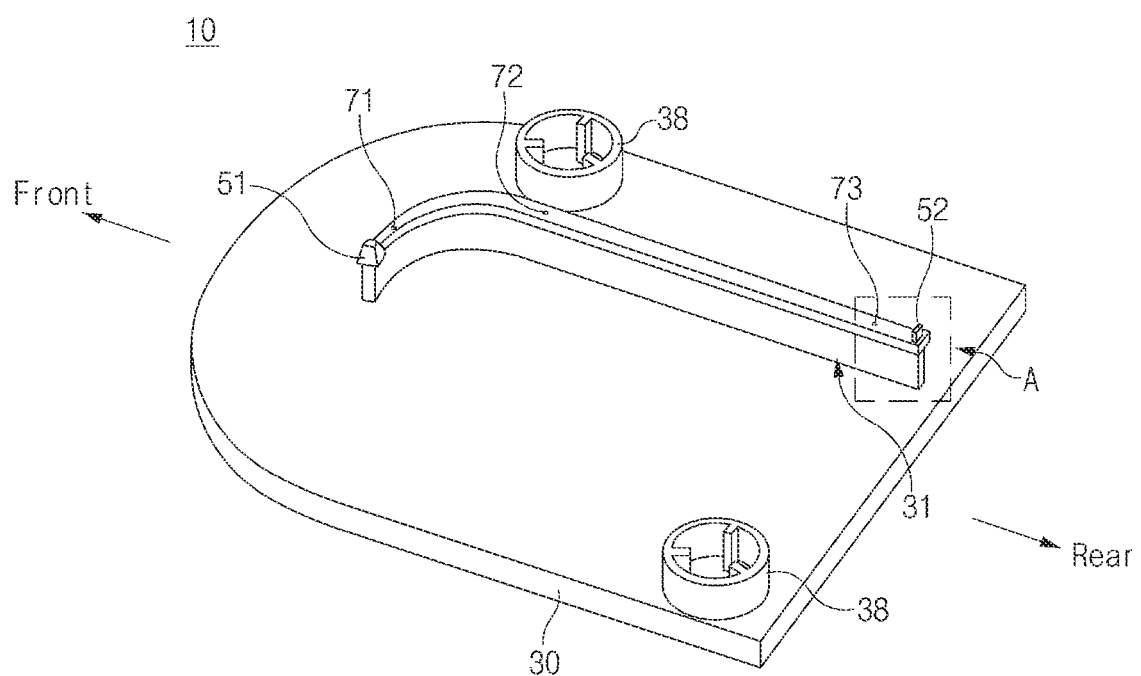
FIG. 2 illustrates a perspective view of a mounting plate of the apparatus for limiting a movement of a wiring harness illustrated in FIG. 1.
Figure 3:
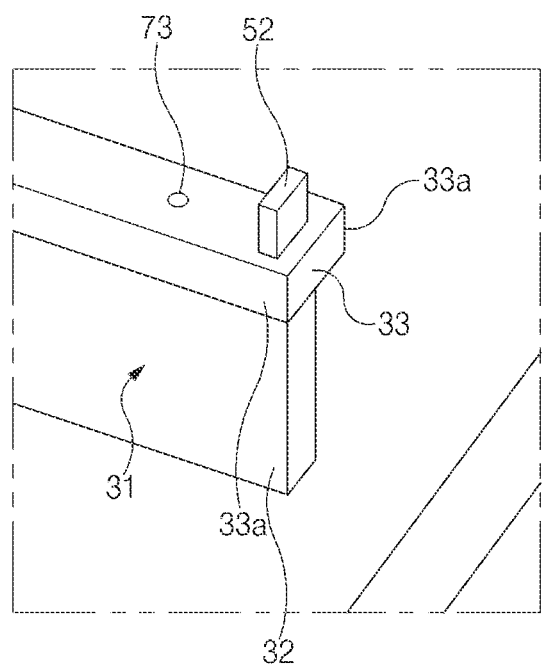
FIG. 3 illustrates an enlarged view of portion A of FIG. 2.

Referring to FIGS. 1 to 3, the mounting plate 30 may be mounted on a floor, a roof, a panel, or the like of the vehicle body adjacent to the moving component such as the vehicle seat or the vehicle door. The mounting plate 30 may have one or more mounting bosses 38 fixing and supporting fasteners such as stud bolts. The fasteners such as stud bolts may be fastened to the vehicle body through the mounting bosses 38 so that the mounting plate 30 may be fixedly mounted on a portion of the vehicle body adjacent to the moving component.

The guide track 31 may have a shape defining a movement path of the binding unit 20. According to the exemplary embodiment illustrated in FIGS. 1 and 2, the guide track 31 may have a curved L-shape, and thus the slider 22 of the binding unit 20 may move along the curved L-shape guide track 31.

Referring to FIGS. 3 and 8, the guide track 31 may include a vertical portion 32 extending vertically and a horizontal portion 33 connected to a top end of the vertical portion 32. Both edges 33a of the horizontal portion 33 may protrude symmetrically from the vertical portion 32, and thus the vertical portion 32 and the horizontal portion 33 may form a T-shaped cross section. The guide track 31 may be received in the guide cavity 22a of the slider 22, and the guide cavity 22a of the slider 22 may have a T-shaped cross section corresponding to the T-shaped cross section of the guide track 31.

Referring to FIGS. 1 and 2, the guide track 31 may have a plurality of holding recesses 71, 72, and 73, and the plurality of holding recesses 71, 72, and 73 may be spaced apart from each other to define a hold position of the binding unit 20 on the guide track 31. The plurality of holding recesses 71, 72, and 73 may be recessed from a top surface of the horizontal portion 33. Each of the holding recesses 71, 72, and 73 may be a hemispherical recess, and the holding protrusion 81 may be a hemispherical protrusion corresponding to the hemispherical shape of the holding recesses 71, 72, and 73. When the slider 22 of the binding unit 20 moves along the guide track 31, the holding protrusion 81 of the slider 22 may be selectively received in any one of the plurality of holding recesses 71, 72, and 73 so that the slider 22 of the binding unit 20 may be held in the corresponding one of the holding recesses 71, 72, and 73.

Referring to FIGS. 1 and 2, the guide track 31 may include a pair of stoppers 51 and 52 limiting the movement of the slider 22 of the binding unit 20 within the movement path defined by the guide track 31. The pair of stoppers 51 and 52 may include a first stopper 51 provided on one end of the guide track 31 and a second stopper 52 provided on the other end of the guide track 31. For example, the first stopper 51 may be fixed to one end of the guide track 31, and the second stopper 52 may be detachably coupled to the other end of the guide track 31. After the slider 22 of the binding unit 20 is mounted to the guide track 31, the second stopper 52 may be coupled to the other end of the guide track 31. Thus, the binding unit 20 and the guide track 31 may be easily assembled.

Figure 4:
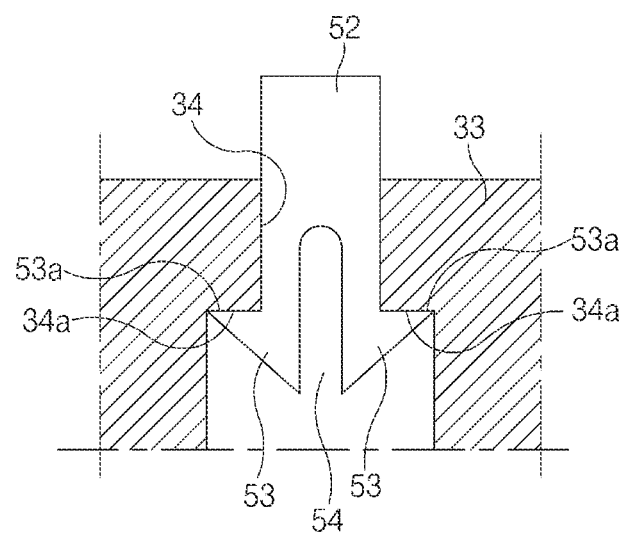
FIG. 4 illustrates a structure in which a second stopper illustrated in FIG. 3 is mounted on a horizontal portion of a guide track.
Figure 5:
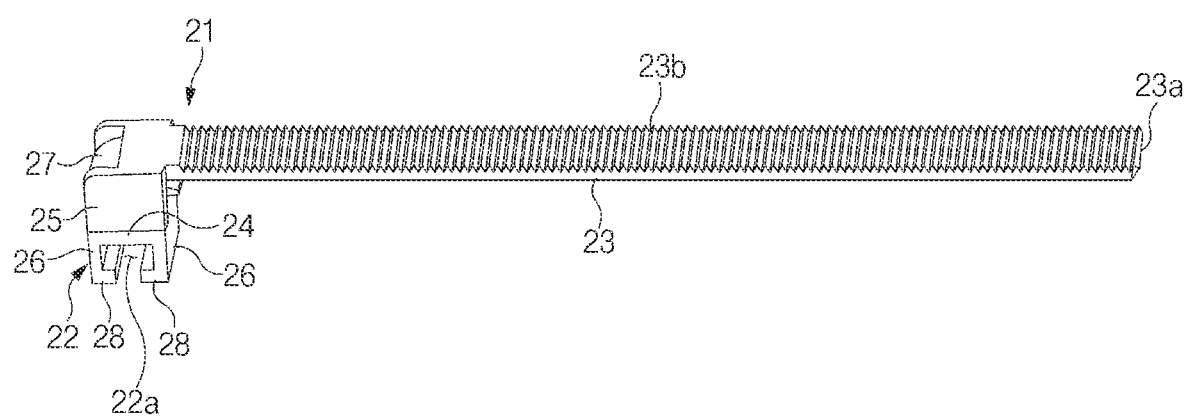
FIG. 5 illustrates a perspective view of a binding unit of an apparatus for limiting a movement of a wiring harness according to an exemplary embodiment of the present disclosure, in a state in which a strap body of the binding unit is unfolded.

Referring to FIGS. 3 and 4, the second stopper 52 may have a pair of legs 53 connected to a bottom portion thereof, and the pair of legs 53 may be spaced apart from each other with a gap 54 therebetween. The pair of legs 53 may be resiliently biased outwards away from each other. Each leg 53 may have an engagement surface 53a. The horizontal portion 33 may have a mounting hole 34 in which the second stopper 52 is mounted, and the mounting hole 34 may be adjacent to the other end of the guide track 31. An engagement shoulder 34a may be located under the mounting hole 34. When the second stopper 52 is inserted into the mounting hole 34, the engagement surface 53a of the leg 53 may engage with the engagement shoulder 34a so that the second stopper 52 may be mounted in the mounting hole 34 of the horizontal portion 33.

Figure 9:
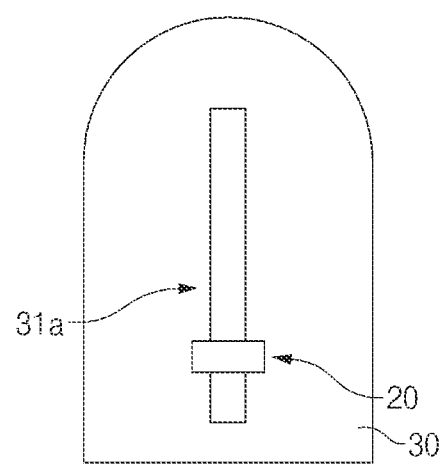
FIG. 9 illustrates a plan view of an apparatus for limiting a movement of a wiring harness according to another exemplary embodiment of the present disclosure.
Figure 10:
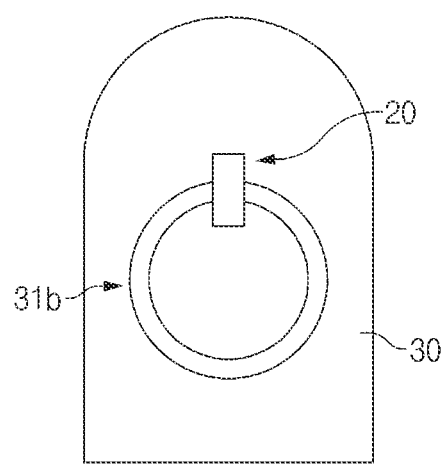
FIG. 10 illustrates a plan view of an apparatus for limiting a movement of a wiring harness according to another exemplary embodiment of the present disclosure.
Figure 11:
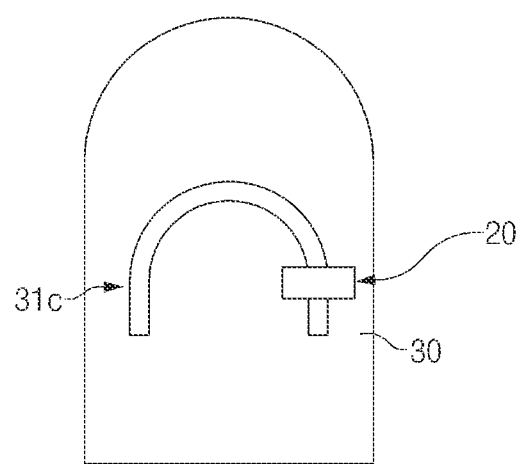
FIG. 11 illustrates a plan view of an apparatus for limiting a movement of a wiring harness according to another exemplary embodiment of the present disclosure.

According to an exemplary embodiment of the present disclosure, the guide track may not be limited to the curved L-shape as illustrated in FIGS. 1 and 2, and may have various shapes as illustrated in FIGS. 9 and 10 in response to the movement path, direction, and the like of the moving component. FIG. 9 illustrates a guide track 31a having a straight shape, FIG. 10 illustrates a guide track 31b having a circular shape, and FIG. 11 illustrates a guide track 31c having a U-shape.

Figure 12:
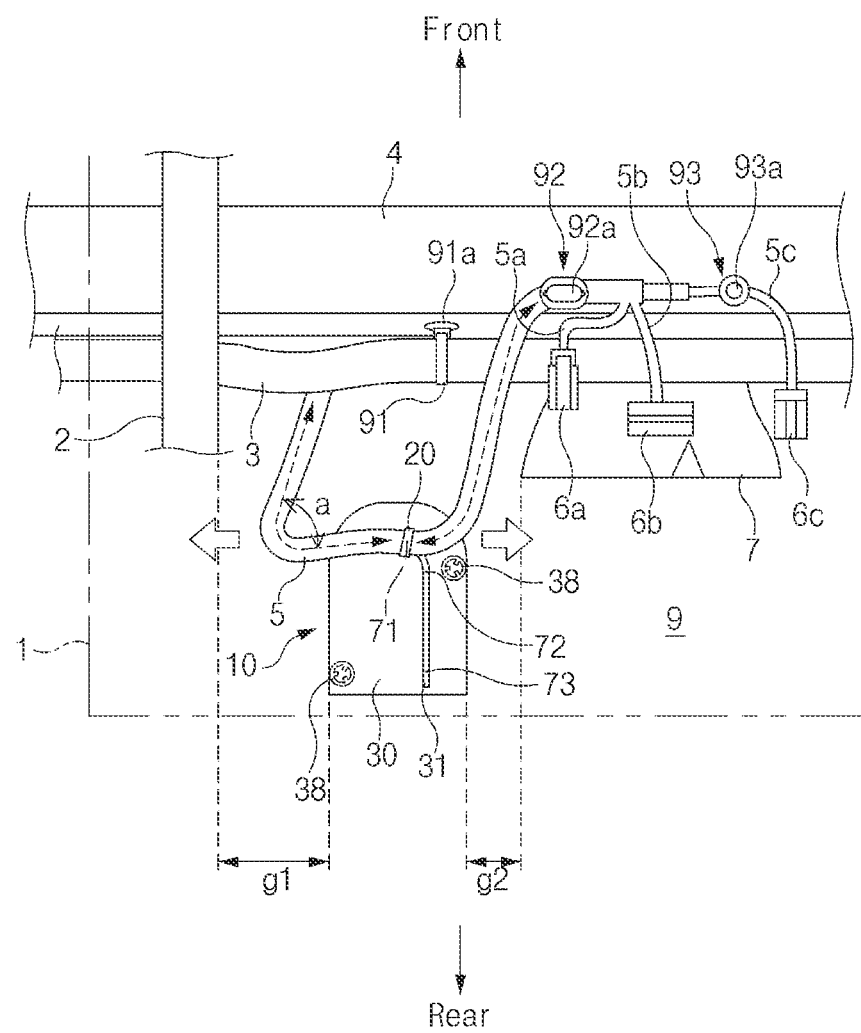
FIG. 12 illustrates a plan view of an apparatus for limiting a movement of a wiring harness according to an exemplary embodiment of the present disclosure, which is applied to a vehicle seat.
Figure 13:
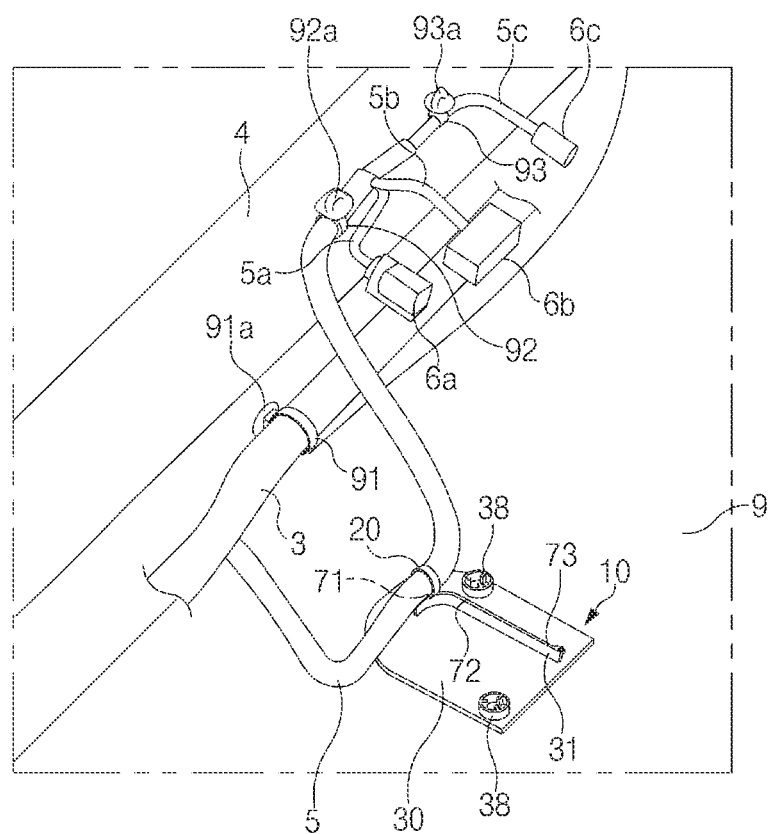
FIG. 13 illustrates a movement of the wiring harness connected to the vehicle seat illustrated in FIG. 12, in a state in which the vehicle seat moves to a front position.
Figure 14:
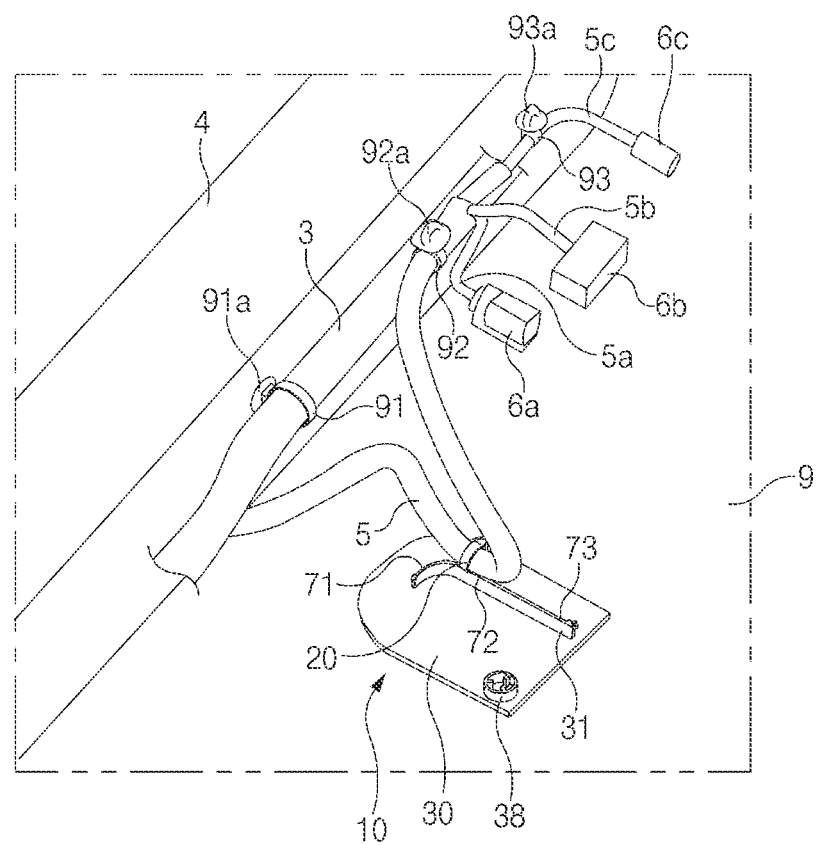
FIG. 14 illustrates a movement of the wiring harness connected to the vehicle seat illustrated in FIG. 12, in a state in which the vehicle seat moves to a neutral position.

FIGS. 12 to 14 illustrate an apparatus for limiting a movement of a wiring harness according to an exemplary embodiment of the present disclosure, which is applied to a vehicle seat 1 as the moving component. Referring to FIGS. 12 to 14, a main wiring harness 3 may be bound to a seat cross member 4 by a cable band 91 on a floor 9 of the vehicle. The cable band 91 may have an anchor 91a, and the anchor 91a of the cable band 91 may be fitted into a mounting hole of the seat cross member 4 so that the main wiring harness 3 may be fixedly connected to the seat cross member 4.

The vehicle seat 1 may include an electric mechanism such as an electric motor. The wiring harness 5 supplying electric energy to the electric mechanism of the vehicle seat 1 may be electrically connected to the vehicle seat 1. The wiring harness 5 may branch out from the main wiring harness 3, and the wiring harness 5 may have a plurality of branch wiring harnesses 5a, 5b, and 5c branching out from a free end thereof. The plurality of branch wiring harnesses 5a, 5b, and 5c may be electrically connected to the electric mechanism of the vehicle seat 1 through a plurality of connectors 6a, 6b, and 6c. In addition, the plurality of branch wiring harnesses 5a, 5b, and 5c may be bound by a plurality of cable bands 92 and 93, and the cable bands 92 and 93 may have anchors 92a and 93a, respectively. The anchors 92a and 93a may be fitted into mounting holes of the vehicle seat 1 so that the end portion of the wiring harness 5 may be fixedly connected to the vehicle seat 1.

The apparatus 10 for limiting a movement of a wiring harness according to an exemplary embodiment of the present disclosure may be disposed under the vehicle seat 1. The mounting plate 30 may be mounted on the floor 9, and the binder 21 of the binding unit 20 may bind the wiring harness 5 so that the binding unit 20 may be connected to the vehicle seat 1 through the wiring harness 5. The binder 21 may bind the wiring harness 5 in a manner that makes a portion of the wiring harness 5 extend in a width direction of the vehicle. The slider 22 of the binding unit 20 may be slidably mounted on the guide track 31. When the vehicle seat 1 moves, the wiring harness 5 may move together with the vehicle seat 1. As the slider 22 of the binding unit 20 moves within the guide track 31, the movement of the wiring harness 5 may be limited within a predetermined range by the binding unit 20 and the guide track 31.

According to an exemplary embodiment, a left edge of the mounting plate 30 may be spaced apart from a seat rail 2 by a first gap g1, and a right edge of the mounting plate 30 may be spaced apart from an air-conditioning duct 7 by a second gap g2. The wiring harness 5 may be bent at a predetermined angle a. The first gap g1 may be 70 mm or more, and the predetermined angle a may be 70-90°. This configuration may minimize interference between the wiring harness 5 and nearby components such as the seat rail 2 and the air-conditioning duct 7 when the wiring harness 5 moves.

Referring to FIG. 2, one end of the guide track 31 may be a front end facing the front of the vehicle, and the other end of the guide track 31 may be a rear end facing the rear of the vehicle. A first holding recess 71 may be adjacent to the front end of the guide track 31, a second holding recess 72 may be adjacent to the middle of the guide track 31, and a third holding recess 73 may be adjacent to the rear end of the guide track 31.

The vehicle seat 1 may be allowed to move to a front position facing the front of the vehicle, a rear position facing the rear of the vehicle, and a neutral position located between the front position and the rear position.

Referring to FIG. 13, when the vehicle seat 1 moves to the front position, the wiring harness 5 may move with the vehicle seat 1 to the front position, and the slider 22 of the binding unit 20 may move to the front end of the guide track 31. Here, as the holding protrusion 81 of the slider 22 is received in the first holding recess 71, the slider 22 may be held in the first holding recess 71.

Referring to FIG. 14, when the vehicle seat 1 moves to the neutral position, the wiring harness 5 may move with the vehicle seat 1 to the neutral position, and the slider 22 of the binding unit 20 may move to the middle of the guide track 31. Here, as the holding protrusion 81 of the slider 22 is received in the second holding recess 72, the slider 22 may be held in the second holding recess 72.

Figure 15:
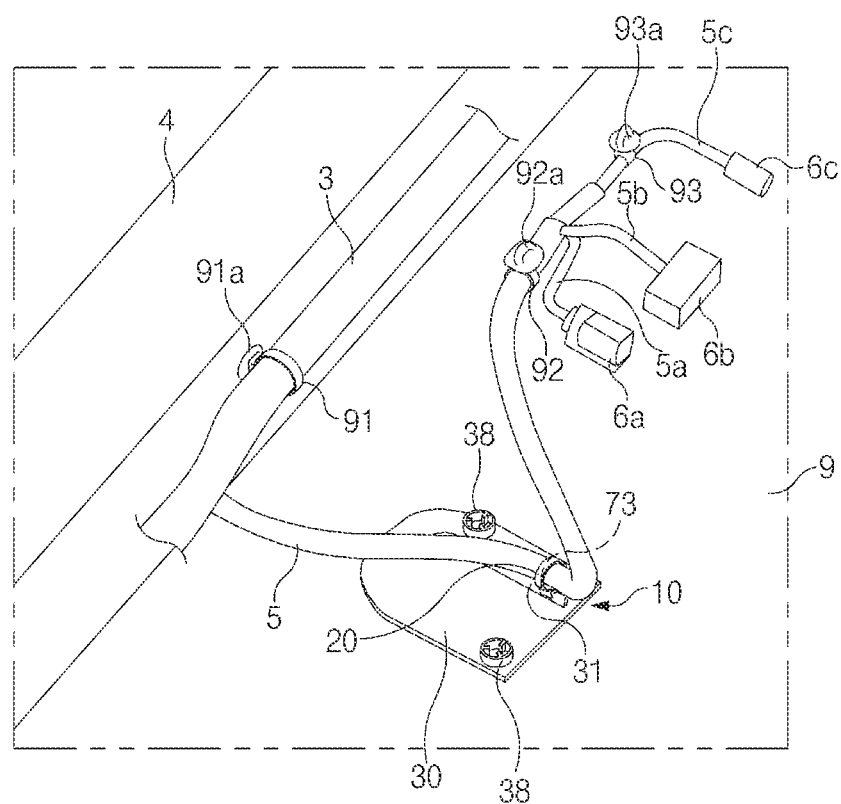
FIG. 15 illustrates a movement of the wiring harness connected to the vehicle seat illustrated in FIG. 12, in a state in which the vehicle seat moves to a rear position.

Referring to FIG. 15, when the vehicle seat 1 moves to the rear position, the wiring harness 5 may move with the vehicle seat 1 to the rear position, and the slider 22 of the binding unit 20 may move to the rear end of the guide track 31. Here, as the holding protrusion 81 of the slider 22 is received in the third holding recess 73, the slider 22 may be held in the third holding recess 73.

As set forth above, according to exemplary embodiments of the present disclosure, by limiting the movement direction, path, and the like of the wiring harness connected to the moving component such as the vehicle seat or the vehicle door, the creation of damage, noise, etc. due to friction with other components may be prevented.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus for limiting movement of a wiring harness, the apparatus comprising:
    a binding unit configured to bind a wiring harness that is electrically connected to a moving component that is configured to be movable relative to a vehicle body, the binding unit configured to be movable according to a movement of the moving component; and
    a guide track configured to guide a movement of the binding unit, wherein the guide track defines a movement path of the binding unit;
    wherein the binding unit includes a binder configured to encircle and bind an exterior surface of the wiring harness, and a slider connected to the binder, wherein the slider is configured to slide along the guide track; and
    wherein the slider has a guide cavity in which the guide track is received, and wherein a cross section of the guide cavity corresponds to a cross section of the guide track.

2. The apparatus according to claim 1, wherein:
    the guide track has a plurality of holding recesses;
    the plurality of holding recesses are spaced apart from each other on the guide track; and
    the slider has a holding protrusion configured to be selectively received in any one of the plurality of holding recesses.

3. The apparatus according to claim 2, wherein the holding protrusion is a hemispherical protrusion and each holding recess is a hemispherical recess.

4. The apparatus according to claim 1, wherein the guide track includes a pair of stoppers configured to limit a movement of the slider.

5. The apparatus according to claim 4, wherein the pair of stoppers includes a first stopper fixed to a first end of the guide track, and a second stopper detachably coupled to a second end of the guide track.

6. The apparatus according to claim 1, wherein:
    the binder includes a strap body having a plurality of teeth, and a head portion integrally connected to the strap body; and
    the head portion includes an opening through which a free end of the strap body passes, and a latch configured to be selectively engaged with any one of the plurality of teeth.

7. The apparatus according to claim 1, further comprising a mounting plate to which the guide track is attached, wherein the mounting plate is configured to be mounted on a portion of the vehicle body adjacent to the moving component.

8. The apparatus according to claim 1, wherein the guide track includes a vertical portion and a horizontal portion, and both edges of the horizontal portion protrude symmetrically from the vertical portion.

9. The apparatus according to claim 1, wherein the moving component is a vehicle seat.

10. An apparatus for limiting movement of a wiring harness, the apparatus comprising:
   a binding unit configured to bind the wiring harness electrically connected to a moving component configured to be movable relative to a vehicle body, the binding unit configured to be movable according to a movement of the moving component, the binding unit comprising:
      a binder configured to encircle and bind an exterior surface of the wiring harness; and
      a slider connected to the binder and including a guide cavity in which a guide track is received, wherein a cross section of the guide cavity corresponds to a cross section of the guide track, wherein the slider is configured to slide along the guide track configured to guide a movement of the binding unit, and wherein the guide track defines a movement path of the binding unit, the slider including a top wall attached to a bottom surface of the binder, a pair of sidewalls extending vertically from the top wall, and a pair of bottom walls extending from the pair of sidewalls.

11. The apparatus according to claim 10, wherein the guide cavity is defined by the top wall, the pair of sidewalls, and the pair of bottom walls.

12. The apparatus according to claim 10, wherein the guide track includes a vertical portion and a horizontal portion, and both edges of the horizontal portion protrude symmetrically from the vertical portion.

13. The apparatus according to claim 10, wherein the moving component is a vehicle seat.

14. A vehicle comprising:
   a vehicle body;
   a moving component coupled to the vehicle body and configured to be movable relative to the vehicle body;
   a wiring harness electrically connected to the moving component;
   a mounting plate mounted on a portion of the vehicle body adjacent to the moving component;
   a guide track attached to the mounting plate;
   a binder encircling an exterior surface of the wiring harness to bind the wiring harness and configured to be movable according to a movement of the moving component; and
   a slider connected to the binder and including a guide cavity in which the guide track is received, wherein the slider is configured to slide along the guide track.

15. The vehicle according to claim 14, wherein:
   the guide track has a plurality of holding recesses;
   the plurality of holding recesses are spaced apart from each other on the guide track; and
   the slider has a holding protrusion configured to be selectively received in any one of the plurality of holding recesses.

16. The vehicle according to claim 15, wherein the holding protrusion is a hemispherical protrusion and each holding recess is a hemispherical recess.

17. The vehicle according to claim 14, wherein the guide track includes a pair of stoppers configured to limit a movement of the slider, the pair of stoppers including a first stopper fixed to a first end of the guide track, and a second stopper detachably coupled to a second end of the guide track.

18. The vehicle according to claim 14, wherein:
   the binder includes a strap body having a plurality of teeth, and a head portion integrally connected to the strap body; and
   the head portion includes an opening through which a free end of the strap body passes, and a latch configured to be selectively engaged with any one of the plurality of teeth.

19. The apparatus according to claim 6, wherein:
   the guide track has a plurality of holding recesses;
   the plurality of holding recesses are spaced apart from each other on the guide track; and
   the slider has a holding protrusion configured to be selectively received in any one of the plurality of holding recesses.

20. The apparatus according to claim 6, wherein the guide track includes a pair of stoppers configured to limit a movement of the slider.

* * * * *